Patented Sept. 7, 1937

2,092,712

UNITED STATES PATENT OFFICE 2,092,712

HALO ALKYL AZYL SULPHIDES AND PREPARATION THEREOF

Albert M. Clifford, Stow, Ohio, assignor to Wingfoot Corporation, Wilmington, Del., a corporation of Delaware No Drawing. Application December 7, 1935, Serial No. 53,427

8 Claims. (Cl. 260—44)

This invention relates to a new class of organic compounds and includes the preparation thereof. More particularly, it relates to halo-alkyl azyl sulphides. The compounds have been found to be good accelerators of the vulcanization of rubber when activated with a basic nitrogen-containing accelerator of another class.

Illustrating the compounds of the invention is the following type formula:

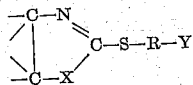

wherein X is sulphur or oxygen, Y is a halogen, R is an alkane group in which one hydrogen has been replaced by the azyl 1-thio radical and another hydrogen has been replaced by Y, and the open bonds of the azyl ring are attached to hydrogen or organic substituents such as alkyl, aralkyl and aryl radicals or may be joined to carbon atoms to form an ortho arylene ring. A formula representing the more preferred compounds of the invention is as follows:

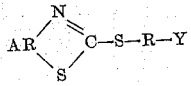

wherein AR is an ortho arylene radical of the benzene and naphthalene series, R is an alkane group containing not more than five carbon atoms and Y is halogen. Thus, it will be noted that the compounds of the invention comprise the halo-alkyl thiazyl sulphides and the halo-alkyl oxazyl sulphides.

The compounds of the invention may be prepared by several different methods. In one method they appear as an intermediate product in the reaction of an alkaline salt of a 1-mercaptothiazole or of a 1-mercaptoxazole with an alkylene dihalide. Preferably this reaction is carried out in an aqueous medium with a short period of heating of, for example, from 1 to 6 hours. In certain cases, it is also advantageous to employ an inert organic solvent in conjunction with the aqueous medium. Because of the instability of the methylene dihalides this process is not, however, preferred for preparing the methane derivatives. The methane derivatives, as well as the higher alkane derivatives, may be prepared by reacting a thiazyl- or oxazyl 1-thio alkylene hydrin with a halogenating reagent, illustrative of which are chlorine, phosphorus trichloride, phosphorus pentachloride, sulphur monochloride, sulphur dichloride, phosphorus oxychloride, and the corresponding bromine compounds. This reaction takes place readily, is exothermic and generally causes the evolution of hydrogen halide gas.

Further illustrating the invention, 197 parts of benzothiazyl 1-thio methylene hydrin and 137.5 parts of phosphorus trichloride (50% excess) were mixed in an open vessel and stirred. An exothermic reaction started immediately accompanied with the evolution of hydrogen chloride gas. On cooling, the product crystallized and gave a quantitative yield of crude product melting at 112–118° C. The product was then recrystallized several times from ethylene dichloride, whereupon chloro methyl benzothiazyl sulphide, or as it may be called, benzothiazyl 1-thio chloro methane, was obtained in substantially pure form melting at 127–128° C. It contained an average chlorine analysis of 16.63% and an average nitrogen analysis of 6.48% as compared with the theoretical chlorine and nitrogen percentages for chloro methyl benzothiazyl sulphide of 16.45% and 6.50%, respectively. The equation representing the reaction is believed to be as follows:

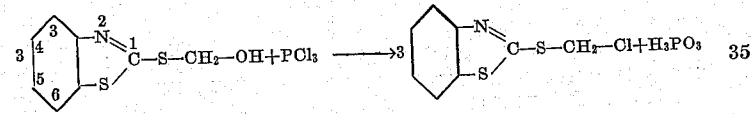

Other members of the alkane series may be prepared similarly simply by employing the homologous benzothiazyl 1-thio alkylene hydrin. Beta chloro ethyl benzothiazyl sulphide has been prepared similarly and is a crystalline compound melting over the somewhat indefinite range of 178–214° C. It contained an average nitrogen content of 5.95%, an average sulphur content of 27.58% and an average chlorine content of 15.08% as compared with the theoretical nitrogen, sulphur and chlorine contents for this compound of 6.10%, 27.92% and 15.44%, respectively.

Beta chloro ethyl benzothiazyl sulphide may also be prepared by refluxing for a period of one hour one mol. of sodium benzothiazyl mercaptide and 1.5 mols of ethylene dichloride in 300 cc. of water and 450 cc. of ethyl alcohol. The product was permitted to cool and upon the addition of water thereto an oily layer formed. The oil was separated from the remaining materials and the low boiling constituents thereof were removed by heating to 100° C. at a pressure of 30-40 mm. 168.6 grams of material remained, which on standing, partially solidified. The crude reaction product was then stirred with 250 cc. of acetone and the solid filtered off. The solid material was extracted with boiling xylene, and the insoluble residue which was recovered melted at 174-214° C. From alcohol the compound crystallizes with alcohol of crystallization which decomposes at 105° C. to a solid melting point 167-169° C.

This compound, beta chloro ethyl benzothiazyl sulphide, melting at 174-214° C., was heated at a temperature of 125-140° C. for 15 minutes and yielded a solid melting at 238-239° C. On recrystallization from alcohol maintained at room temperature, this solid melted with decomposition starting at 105° C. and being completely melted at 168-169° C. In another recrystallization from hot alcohol the product obtained melted at 168-169° C. Analyses for the compound melting at 238-239° C. gave an average nitrogen content of 6.06% and an average chlorine content of 15.15%, showing it to be beta chloro ethyl benzothiazyl sulphide. It appears that this compound exists in two crystalline forms. The equation representing the reaction is as follows:

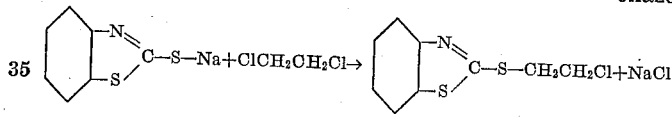

Gamma bromo propyl benzothiazyl suphide is prepared by refluxing for a period of 2½ hours a mixture of 0.5 mols of sodium benzothiazyl mercaptide and 111 grams of trimethylene dibromide (10% excess) in 150 cc. of water and 500 cc. of acetone. The product was cooled somewhat and then poured into 2½ liters of water. After standing for a period of two days the resulting sticky semi-solid obtained from the water was dried by heating to 100° C. at a pressure of 30 mm. An approximate 50% yield was obtained, which would have been much higher except for a considerable loss of material during the separation of the semi-solid from the water. The product, after extraction with chloroform, remained as a yellow solid, melting with decomposition at 254° C. The product analyzed 4.76% nitrogen, 21.54% sulphur and 26.84% bromine as compared with the theoretical nitrogen, sulphur and bromine contents of gamma bromo propyl benzothiazyl sulphide of 4.85%, 22.23% and 27.77%, respectively. The equation representing the reaction is as follows:

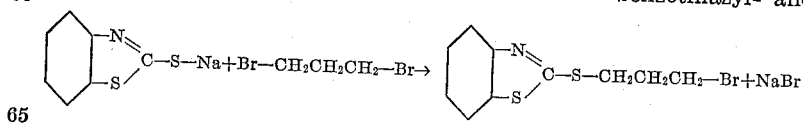

Other halo alkyl thiazyl sulphides, as well as the corresponding oxazyl sulphides, may be prepared similarly. It will be understood that the examples specifically described herein, while descriptive of the invention, are not limitative thereof. The benzothiazyl derivatives and, among them, those in which the alkyl group has not more than five carbon atoms, are preferred, however. The methylene derivatives (R is $CH_2$) are particularly valuable.

Where the materials are prepared by reacting the halo alkane with a 1-mercaptothiazole or 1-mercapto oxazole, it is desirable that a water soluble alkaline salt thereof be used. The alkali metal salts are generally preferred but the ammonium and calcium salts may also be used. Illustrative of the 1-mercaptazoles are the 1-mercapto aryl thiazoles of the benzene and naphthalene series such as 1-mercapto 4-nitro benzothiazole, 1-mercapto 5-nitro benzothiazole, 1-mercapto 3-phenyl benzothiazole, 1-mercapto 4-chlor benzothiazole, 1-mercapto 5-chlor benzothiazole, 1-mercapto 3-methyl benzothiazole, 1-mercapto 6-methyl benzothiazole, 1-mercapto 3-hydroxy benzothiazole, 1-mercapto 3-5-dimethyl benzothiazole, 1-mercapto 5-ethoxy benzothiazole, 1-mercapto 4-methoxy benzothiazole, 1-mercapto alpha naphthathiazole, 1-mercapto beta naphthathiazole, the 1-mercapto tolyl and xylyl thiazoles, etc. Other 1-mercaptothiazoles are 1-mercaptothiazole, 1-mercapto 3-methyl thiazole, 1-mercapto 3-phenyl thiazole, 1-mercapto 3-4-dimethyl thiazole, 1-mercapto 3-ethyl thiazole and the like. Where the expression "arylene radical of the benzene and naphthalene series" is used herein, it is intended to refer to substituted and unsubstituted phenylene and naphthalene radicals, illustrative substituents being those disclosed in this paragraph.

Illustrative of the 1-mercaptoxazoles are the oxazoles corresponding to the aforementioned mercaptothiazoles such as 1-mercapto benzoxazole, 1-mercapto naphthoxazole, 1-mercapto 4-nitro benzoxazole, 1-mercapto 5-ethoxy benzoxazole, 1-mercapto oxazole, and the like.

Other alkylene dihalides which may be employed in the practice of the invention are ethylene dibromide, ethylidene dichloride, 1-2-dichloro propane, 1-1-dichloro propane, sym. amylene dichloride, and other dichlor pentanes, sym. butylene dichloride and other butyl dihalides such as 1-2-dibromo butane. Other poly halo alkanes such as alpha trichlor ethane, beta trichlor ethane, tri brom hydrine, tri chlor hydrine, tetra chlor propane, tri- and tetra-chlor butanes and tri- and tetra-chlor pentanes, may also be used. Exemplary of other hydroxy alkyl thiazyl- and oxazyl sulphides which may be used in preparing the compounds of the invention are hydroxy tri methylene benzothiazyl sulphide, hydroxy amylene benzothiazyl sulphide, hydroxy butyl benzothiazyl sulphide, the corresponding oxazyl sulphides and the corresponding ring-substituted benzothiazyl- and benzo oxazyl sulphides.

Other compounds illustrating the invention are chloro methyl benzoxazyl sulphide, beta chloro ethyl benzoxazyl sulphide, gamma chloro propyl benzoxazyl sulphide, beta bromo ethyl 5-nitro benzothiazyl sulphide, bromo methyl 3-tolyl thiazyl sulphide, alpha chloro ethyl 5-ethoxy benzothiazyl sulphide, chloro methyl 3-phenyl benzothiazyl sulphide, delta chloro butyl benzothiazyl sulphide, and the chloro amyl benzothiazyl sulphides. Others are chloro methyl thiazyl sulphide, beta chloro ethyl oxazyl sulphide, beta chloro ethyl 3-phenyl thiazyl sulphide, and the like.

It will be apparent that by this invention a valuable class of compounds is provided. They are accelerators of rubber vulcanization when employed in conjunction with a basic nitrogen-containing accelerator of another class, such as diphenylguanidine, p-p' diamino diphenyl methane, diortho tolyl guanidine succinate, diphenylguanidine phthalate, urea, urea succinate and the like.

They also may be employed as intermediates for the manufacture of other thiazyl and oxazyl derivatives. For example, beta beta' naphthoxy ethyl benzothiazyl sulphide is prepared by refluxing in alcohol solution molar quantities of beta chloro ethyl benzothiazyl sulphide and sodium beta naphtholate. The equation representing the reaction is as follows:

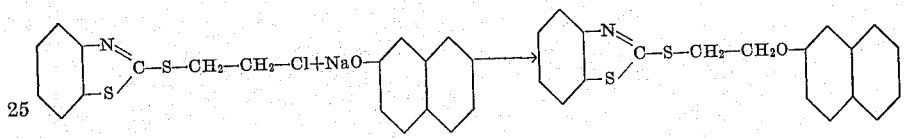

The compounds of the invention may also be employed as reactants with metal salts of dithiocarbamic acids, with metal salts of dithio acids such as dithio benzoic and dithio furoic acids, with phenols, thio phenols, naphthols, with metal salts of carboxylic acids, etc. For example, the reaction product of sodium dimethyl dithiocarbamate and beta chloro ethyl benzothiazyl sulphide has been prepared by refluxing molar quantities of the reactants in alcohol solution. The reaction is believed to proceed as follows:

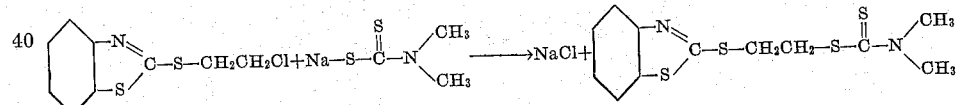

Similarly, the corresponding penta methylene dithiocarbamate derivative has been prepared. Others which may be prepared are the corresponding dibenzyl-, diethyl-, dibutyl-, diamyl-, N-ethyl cyclohexyl, N-butyl tetrahydro alpha furfuryl, and ditetrahydro alpha furfuryl dithio carbamic acid derivatives. Any of the halo alkyl thiazyl- or oxazyl sulphides of the invention may be reacted with these materials to prepare compounds which are useful in rubber vulcanization.

Other illustrative examples which may be prepared by employing the compounds of the invention as intermediates are phenoxy methyl benzothiazyl sulphide, thio phenoxy methyl 5-nitro benzothiazyl sulphide, thio cresyl oxy methyl 3-methoxy benzo-thiazyl sulphide, the reaction product of beta chloro ethyl benzo thiazyl sulphide and the sodium salt of dithiobenzoic acid, the reaction product of chloro methyl benzothiazyl sulphide and sodium benzoate, the reaction product of chloro methyl benzothiazyl sulphide and ammonium dithiofuroate, the reaction product of gamma bromo propyl benzothiazyl sulphide and sodium dithioacetate, and the reaction product of chloro methyl benzothiazyl sulphide and sodium acetate.

Although only the preferred forms of the invention have been described in detail, it will be apparent to those skilled in the art that the invention is not so limited but that various modifications may be made therein without departing from the spirit of the invention or from the scope of the appended claims, wherein it is intended to cover by suitable expression all features of patentable novelty residing in the invention.

What I claim is:
1. A compound having the formula

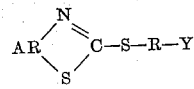

wherein AR is an ortho arylene radical of the benzene and naphthalene series, R is CH₂, and Y is halogen.

2. Chloro methyl 1-benzothiazyl sulphide.
3. Beta chloro ethyl benzothiazyl sulphide.
4. Gamma bromo propyl benzothiazyl sulphide.
5. A compound having the formula

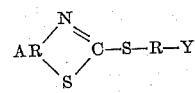

wherein AR is an ortho arylene radical of the benzene and naphthalene series, R is an alkane group containing not more than five carbon atoms and Y is halogen.

6. A compound having the formula

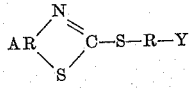

wherein AR is an ortho arylene radical of the benzene and naphthalene series, R is an alkane group containing not more than five carbon atoms and Y is a halogen selected from the group consisting of chlorine and bromine.

7. A compound having the formula

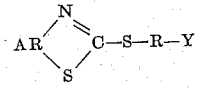

wherein AR is ortho phenylene, R is an alkane group containing not more than five carbon atoms and Y is a halogen selected from the group consisting of chlorine and bromine.

8. A compound having the formula

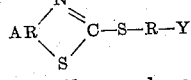

wherein AR is an ortho arylene radical of the benzene and naphthalene series, R is CH₂ and Y is chlorine.

ALBERT M. CLIFFORD.